Figure 1:
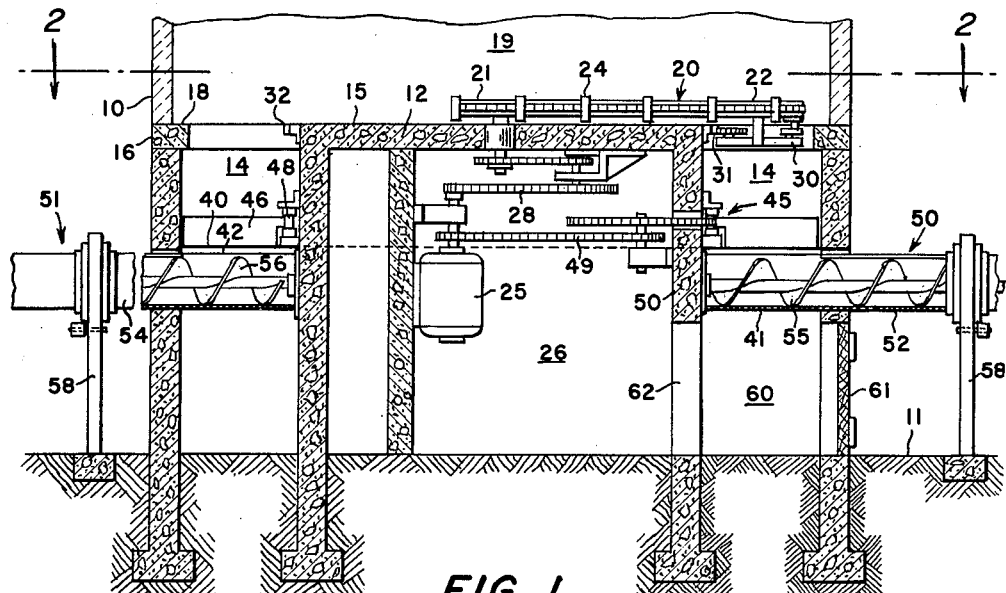

INVENTOR.
ALBERT M. BEST
BY
*Joseph A. Brown*
ATTORNEY 3,193,117
SILO UNLOADER
Albert M. Best, New Holland, Pa., assignor to Sperry Rand Corporation, New Holland, Pa., a corporation of Delaware
Filed Oct. 23, 1963, Ser. No. 318,331
3 Claims. (Cl. 214—17)

This invention relates to a structure for storing feed material for stock animals and to means at the bottom of the structure by which the material may be mechanically unloaded and distributed.

A vertical silo is filled by blowing silage or other material through an inlet at the top of the silo structure. The material falls by gravity and gradually builds up in the silo until a column of material is formed. To have the material removed first which is put in first, it is necessary to unload the silo at the bottom. One advantage of unloading at the bottom is that as material is removed from the lower end of the column, the mass moves downwardly and additional material may be added to the top of the column. This contrasts with the procedure of unloading a silo beginning at the top, where all the material in the structure should be removed before any additional material is admitted.

Silo unloaders of various types have been provided which operate at the silo bottom, see U.S. Patent No. 3,093,110. In the device disclosed in such patent, feed is distributed in an annular trough about a table within and at the bottom of the silo. Access openings are provided in the silo wall so that animals may project their heads into the structure and feed from the trough. With such an arrangement, the number of animals that can feed at any one time is limited by the number of available openings and the number of openings is restricted by the size of the silo and the wall space available for openings. Further, the openings must be adequately spaced from each other to provide sufficient wall structure to support the upwardly extending silo wall.

One object of this invention is to provide feed storage and distribution apparatus employing bottom unloading and an arrangement whereby a large number of animals may receive feed at one time.

Another object of this invention is to provide feed storage and distribution apparatus wherein feed is gathered at the bottom of a silo in an annular supply and then conveyed to an angular location for delivery to means which will distribute the feed outwardly of the silo.

Another object of this invention is to provide feed storage and distribution apparatus of the character described wherein side openings at the bottom of the silo are kept to a minimum.

A further object of this invention is to provide feed storage and distribution apparatus wherein the arrangement is such that feed may be easily and conveniently withdrawn from the silo at a plurality of angularly spaced locations about the silo.

A still further object of this invention is to provide feed storage and distribution apparatus which is relatively low in cost and has operative components easily accessible for adjustment and repair.

Other objects of this invention will be apparent hereinafter from the specification and from the recital in the appended claims.

Figure 2:
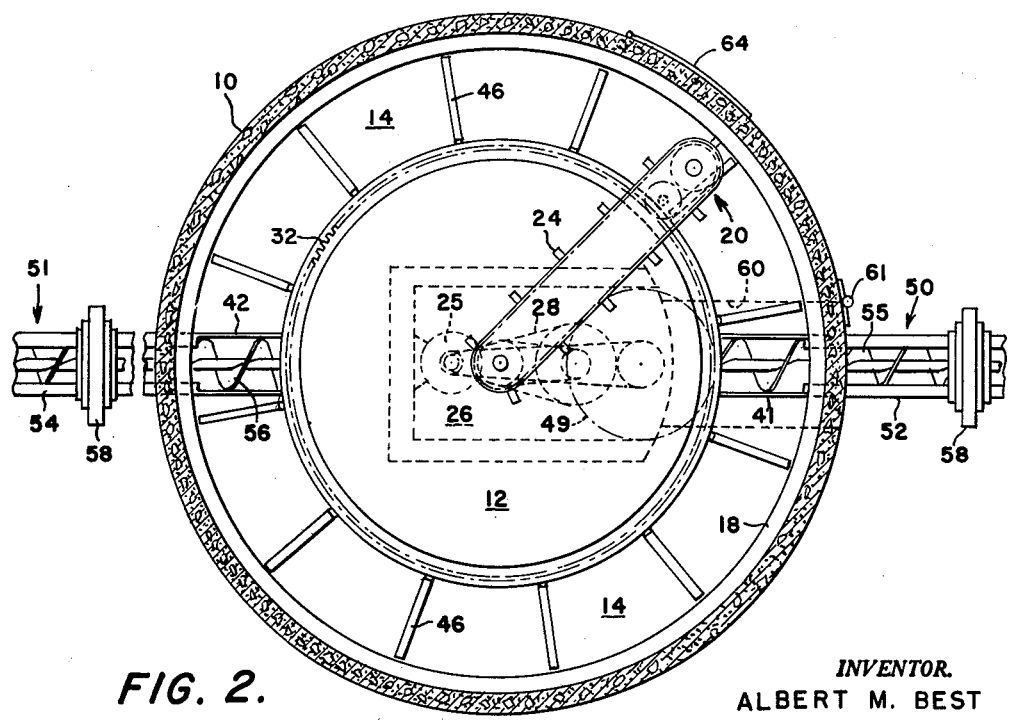

In the drawing:

FIG. 1 is a medial vertical section through feed storage and distribution apparatus constructed according to this invention and showing the feed gathering means thereof in a given location; and FIG. 2 is a transverse section taken on the line 2—2 of FIG. 1 looking in the direction of the arrows and showing the structure in plan, with the feed gathering means in a different location.

Referring now to the drawing by numerals of reference, 10 denotes a vertically extending cylindrical silo or storage receptacle supported on the ground 11. Within silo 10 is a table 12 which is also cylindrical and coaxial with the vertical axis of the silo. The table 12 extends upwardly several feet from ground 11 and the outside diameter of the table is less than the inside diameter of the silo whereby an annular trough 14 is formed between the table and the silo. Table 12 has a top surface 15 which is horizontal and the silo is provided with an inwardly projecting ring 16 which forms a horizontal shelf 18 coplanar with the top of the table. The table surface 15 and shelf 18 cooperate to support a column of feed material in storage space 19 within the silo 10.

Operable over the table 12 to remove material from the lower end of the column of silage in the silo 10 is a sweep arm 20 having an inner end 21 coaxial with the vertical axis of the silo and an outer end 22 which overhangs trough 14. The sweep arm moves in a horizontal plane and it is provided with endless gathering means 24 which operates to remove material and deposit it in trough 14. Conveyor 24 is driven by a motor 25 within a chamber 26 underneath table 12. Motor 25 operates through a drive train 28 to power conveyor 24. At the outer end of sweep arm 20, rotatable power is picked off by drive means 30 to rotate a pinion 31 carried on the arm and meshing with a ring gear 32 affixed to and extending around the upper periphery of table 12. The construction and drive of the sweep arm and gathering means is similar to that shown in U.S. Patent No. 3,093,110.

As the sweep arm operates, it removes a layer of material from the bottom of the column in the silo 10 over table 12. As the arm swings around, the material is moved radially outwardly of table 12 and deposited in the trough 14. The material in the silage column over trough 14 is broken loose and falls straight down, while the material over shelf 18 is swept inwardly by conveyor 24 as it moves over the shelf.

Trough 14 has a bottom 40 and at angularly spaced locations discharge outlets 41 and 42 are provided. These discharge outlets comprise downwardly extending openings in the bottom 40 into which material may be deposited. The outlet 42 is diametrically opposite outlet 41. To move the material along trough 14 for deposit in the respective outlets, a conveyor 45 is provided having radially extending angularly spaced paddles 46 which sweep across the bottom 40 of the trough. These paddles are driven and carried on an endless member 48 driven by a power train 49 from the motor 25. The power train projects outwardly of the wall 50 of table 12, FIG. 1. When conveyor 45 operates, paddles 46 sweep half of the material in the trough to discharge outlet 41 and the other half to discharge outlet 42.

For withdrawing material from the outlets and for distributing it to stock animals, a feeder 50 is provided which extends outwardly of the silo in a location in register with the discharge 41. A second feeder 51 is provided which extends outwardly of the opposite side of the silo in register with discharge outlet 42. Feeder 50 has a fixed U-shaped tubular section 52 which projects through the silo and into discharge outlet 41 to receive the material delivered by the conveyor 45. Feeder 51 has a similar section 54 which projects into the silo and receives the feed at discharge outlet 42. Feeder 50 has an auger 55 and feeder 51 an auger 56 which operate to withdraw material from their respective outlets and to convey the material in a direction away from silo 10. Beyond support stands 58, each feeder is preferably constructed along the lines of the stock feeder shown in Winter U.S. Patent No. 2,940,639 wherein feed is conveyed throughout the length of the feeder and then the container which receives the feed is rotated to dump the material simultaneously along the full length of the device so that all animals receive feed at the same time. Each feeder has a longitudinal slot for the discharge of material.

Beneath section 52 of feeder 50, a tunnel 60 is provided to the chamber 26 beneath table 12. This tunnel is closed by a door 61 and table 12 is provided with an opening 62 into chamber 26. Through this door and tunnel ready access is provided to motor 25 and to drive train 28 to the conveyor sweep arm 20 and drive train 49 to conveyor 45. Also, one or more doors 64 (FIG. 2) may be provided in the side wall of the silo 10 and at a height to register with trough 14 and sweep arm 20 to provide direct access to both the conveyor 45 and the sweep arm.

In operation, motor 25 operates through train 28 to drive conveyor 24 around sweep arm 20. As the conveyor travels, it dislodges material at the bottom of the column in the silo 10 and deposits the material in trough 14. At the outer end of the sweep arm, drive 30 operates through pinion 31 and ring gear 32 to cause the sweep arm to move in a horizontal path about the silo axis. Material deposited in trough 14 is conveyed along the trough by paddles 46 of conveyor 45. At the discharge outlets 41 and 42, material drops downwardly into the sections 52 and 54 of the feeders 50 and 51. The augers 55 and 56 of the respective feeders gather material and withdraw it from the silo. Material is conveyed outwardly of the silo structure and distributed for the animals to feed.

In the structure described, two stock feeders are shown and diametrically spaced. However, it will be obvious that any desired number of stock feeders may be provided and the number of animals which can be accommodated from a single silo is in no way restricted by the diameter of the silo structure. The arrangement provides great versatility and allows many variations of the basic structure to adapt the silo, unloader and feeders to various farmstead operations. For example, if desired the feeders 50 and 51 can be disposed at a ninety degree angle to each other or they may be extended from the silo at any desired convenient angular relation. The structural arrangement is relatively inexpensive and provides a versatility and operational arrangement heretofore unavailable.

While this invention has been described in connection with a particular embodiment thereof, it will be understood that it is capable of modification, and this application is intended to cover any variations, uses, or adaptations following, in general, the principles of the invention including such departures from the present discloses as come within known or customary practice in the art to which the invention pertains, and as fall within the scope of the invention or the limits of the appended claims.

Having thus described my invention, what I claim is:

1. Feed storage and distribution apparatus comprising, in combination, a vertically extending silo having a substantially continuous cylindrical wall of a given diameter and said wall having a bottom portion supported by the ground, a table of lesser diameter within said silo at the bottom thereof and defining with said wall a substantially enclosed annular trough which surrounds the table, said table having a generally horizontal top surface upon which material stored in said silo rests, a sweep arm directly over said table having an inner end adjacent the vertical axis of said silo and an outer end overhanging said trough, gathering means on said sweep arm operable to move material radially outwardly relative to said axis and to deposit the material in said trough, means driving said sweep arm to swing in a horizontal plane about said axis, a stock feeder extending outwardly of said silo bottom and having an end projecting into the silo and communicating with said trough, conveyor means in said trough operable to move deposited material along the trough and to deliver the material to said one end of said feeder, said feeder end being located beneath said conveyor means, and the feeder having means for withdrawing delivered material and for distributing said material along the length of the feeder in a direction away from the silo.

2. Feed storage and distribution apparatus comprising, in combination, a vertically extending silo having a substantially continuous cylindrical wall of a given diameter, and said wall having a bottom portion supported by the ground, a table of lesser diameter within said silo at the bottom thereof and defining with said wall a substantially enclosed annular trough which surrounds the table, said table having a generally horizontal top surface upon which material stored in said silo rests, a sweep arm directly over said table having an inner end adjacent the vertical axis of said silo and an outer end overhanging said trough, gathering means on said sweep arm operable to move material radially outwardly relative to said axis and to deposit the material in said trough, means driving said sweep arm to swing in a horizontal plane about said axis, a stock feeder extending outwardly of said silo bottom and having an end projecting into the silo and communicating with said trough, conveyor means in said trough operable to move deposited material along the trough and to deliver the material to said one end of said feeder, said feeder end being located beneath said conveyor means, the feeder having means for withdrawing delivered material and for distributing said material along the length of the feeder in a direction away from the silo, a power source underneath said table, and connection being provided to said power source to swing said sweep arm, operate said gathering means and drive said conveyor.

3. Feed storage and distribution apparatus as recited in claim 2 wherein the power connection to said sweep arm is through said table top surface and the drive to the conveyor is through the side of the table.

References Cited by the Examiner

UNITED STATES PATENTS 2,981,402  4/61  Cleveland _____ 214—17.84 X
3,068,839  12/62 Bruecker _____ 214—17.82 X
3,093,110  6/63  Evans _____ 214—17.82 X

OTHER REFERENCES

German printed application, 1,109,091, June 15, 1961.

GERALD M. FORLENZA, *Primary Examiner.*

HUGO O. SCHULZ, *Examiner.*